Nov. 1, 1960   G. L. ALLISON   2,958,560
LATCH TRIP FOR DUMP TRUCK TAIL GATE
Filed Aug. 7, 1956   2 Sheets-Sheet 1

Grady L. Allison
INVENTOR.

Nov. 1, 1960   G. L. ALLISON   2,958,560
LATCH TRIP FOR DUMP TRUCK TAIL GATE
Filed Aug. 7, 1956   2 Sheets-Sheet 2
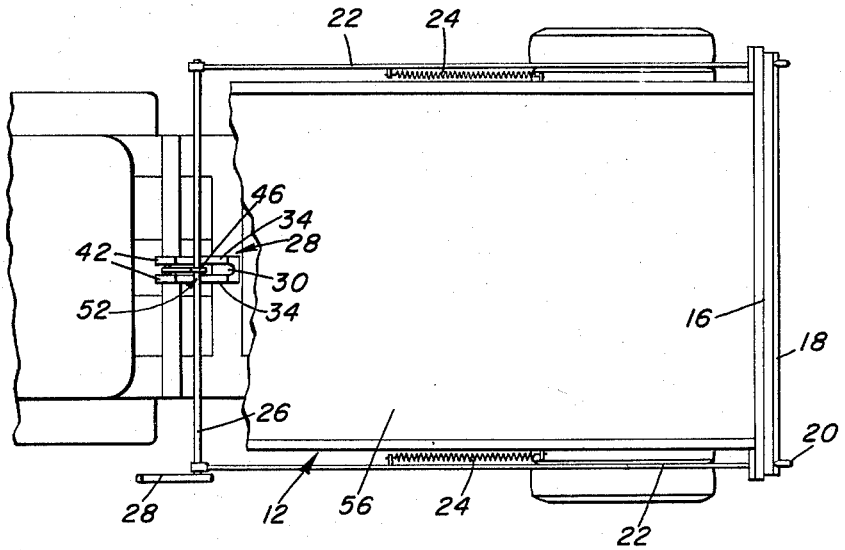
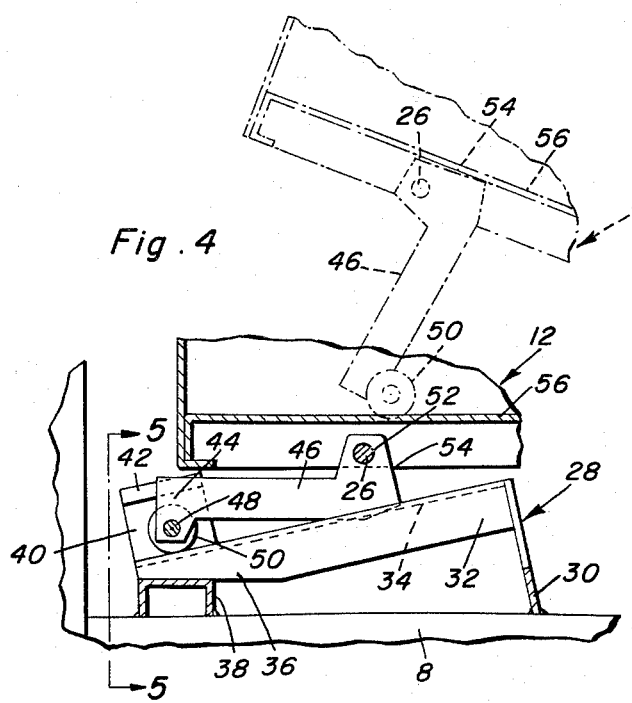
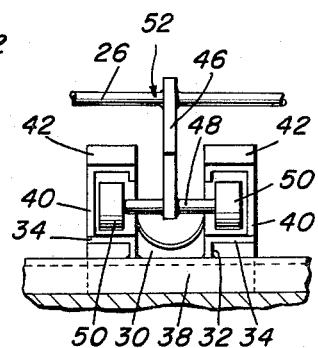
Grady L. Allison
INVENTOR.

United States Patent Office 2,958,560
Patented Nov. 1, 1960

2,958,560
LATCH TRIP FOR DUMP TRUCK TAIL GATE
Grady L. Allison, 3329 NW. 12th, Oklahoma City, Okla.
Filed Aug. 7, 1956, Ser. No. 602,619
3 Claims. (Cl. 298—23)

The present invention relates to improved structural means which functions automatically to operate a rotatably mounted shaft located on the forward end of a dump truck body and which shaft, in turn, controls the action of push-pull rods slidably mounted on said body and carrying trip latches, the latter functioning to permit the tail gate to be latched and unlatched depending on the respective dumping and transporting positions of said dump body.

As is reasonably well clear from the preceding general statement of the subject matter of the invention, it is common in the art to provide slidably mounted spring biased latch-equipped push-pull rods on the lengthwise sides of a liftable and lowerable dump body. Various forms of latches are employed but in the instant arrangement the latches are rigid hooks on the trailing ends of the push-pull rods. These hooks are arranged to releasably engage retainers provided therefor on the lower edge of a hingedly mounted tail gate. Under ordinary circumstances the forward ends of the push-pull rods are operatively connected with a transverse shaft and in most instances the shaft is provided at, at least one end with a crank handle so that the driver or other attendant may catch hold of the crank handle and release the latches at the desired time and allow the tail gate to open and so that the load of sand, gravel or the like on the dump body may gravitate to the ground or elsewhere in a generally well known manner. As is perhaps already reasonably clear, it is the object of the instant invention to provide means, simple in nature, which means serves to automatically trip and rotate the shaft, whereby the latches satisfactorily control the opening and closing positions of the aforementioned tail gate.

In carrying out the principles of the invention a laterally disposed crank arm is joined with the central portion of the shaft and is provided at its lower end with freely idling rollers having anti-friction and rolling contact with simple tracks embodied in a suitably fixed ramp-like device. More specifically, novelty is predicated on the structural details so far disclosed and wherein the ramp-like means or device is characterized by a pair of spaced parallel fixedly mounted inclined tracks with which the camming rollers coact to, in this manner, move the crank arm forwardly and rearwardly to actuate the shaft.

Other objects, features and advantages will become more readily apparent from the following description and the accompanying sheets of illustrative, but not restrictive, drawings.

In the drawings, wherein like numerals are employed to designate like parts throughout the views:

Fig. 3 is a plan view in which the forward end portion of the dump truck body is broken away to expose the structural details located centrally therebeneath;

Fig. 4 is an enlarged and exaggerated detail view in section and elevation focusing attention on the aforementioned latching and unlatching means; and Fig. 5 is a section on the line 5—5 of Fig. 4 looking in the direction of the arrows.

Figure 1:
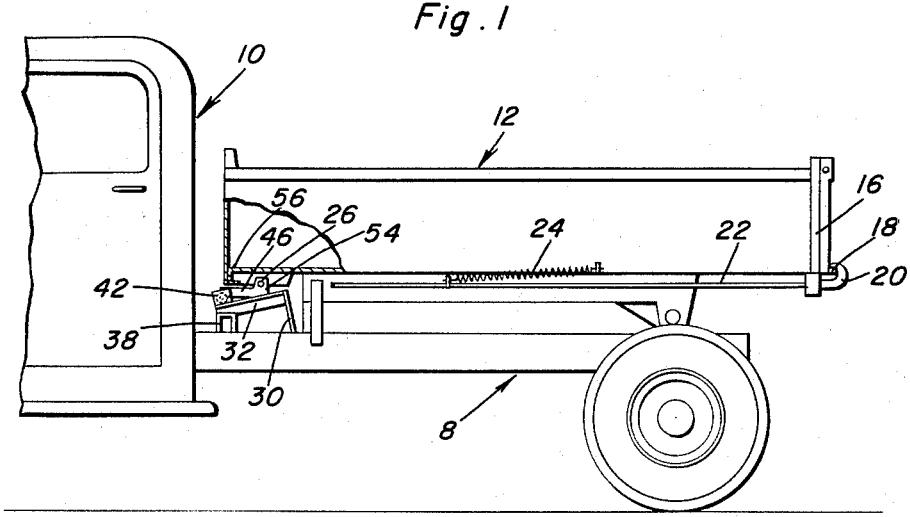
Fig. 1 is a fragmentary view partly in section and partly in elevation of a conventional-type dump truck and wherein the improved automatic latching and unlatching means is embodied and readied for use.
Figure 2:
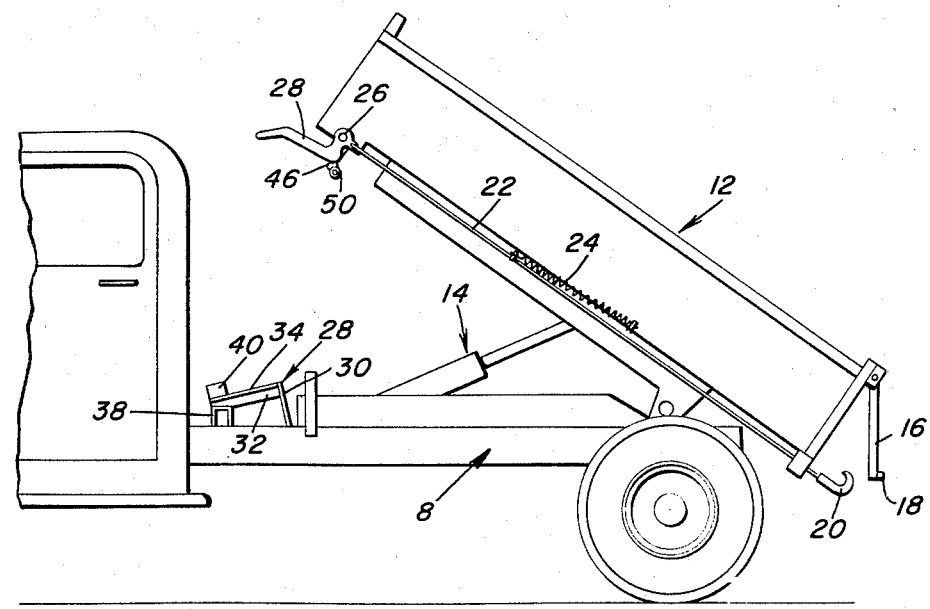
Fig. 2 is a view in elevation based on the showing seen in Fig. 1 and therefore illustrating approximately the same details but showing the relationship thereof when the invention has functioned to release the tail gate latches.

As shown in the drawings the truck includes a mobile chassis denoted generally at 8 and having a cab 10 and a hingedly mounted dump body 12 and lifting and lowering hydraulic jack or equivalent means therefor as denoted at 14. The pivoted or hinged tail gate is denoted at 16 and has a suitable retainer 18 for the hook-shaped latches 20 fixed on the adjacent cooperating rear end portions of the slidably mounted push-pull rods 22. These rods 22 are mounted on both sides of the dump body in the manner shown and are biased by way of coil or equivalent springs 24. The aforementioned angularly rotatable shaft is denoted by the numeral 26 and is supported in bearings on and beneath the forward end of the dump body in the usual way and has operating connection with the push-pull rods and on one end at least is provided with a hand crank 28 which, under ordinary circumstances, is employed to apply and remove the latch means and to allow the tail gate to swing open when the dump body goes up as shown in Fig. 2. In the instant invention the details so far described of the dumping truck construction are allowed to remain and the automatic controller device is incorporated without requiring material alterations. This device is made up, broadly speaking, of one structural part on the chassis and the other on the dump body. The part or unit mounted on the chassis is here referred generally as a ramp-like device or cam and is denoted at 28. As perhaps best shown in Figs. 4 and 5, it comprises a pair of spaced parallel forwardly and downwardly inclined tracks. The rearward ends are connected by way of an inclined support plate 30 fixed on the chassis as shown. Each track comprises a suitable length of angle iron and includes a vertical flange 32 and a horizontal flange 34 which is the camming track proper. It will be noticed that the forward end of the angle iron is narrowed and gradually reduced to the approximate dimensions shown in Fig. 4 at the left as at 36 where it is supported on an appropriate rigid mount 38 on the chassis, that is, the chassis frame. At the forward or left-hand ends of the tracks are provided a pair of fixed upstanding keeper hooks the shank of which is denoted at 42. These tracks and hooks serve to accommodate the end portion 44 of the automatic crank arm 46 which end portion is provided with a shaft 48 having idling rollers 50 mounted on the outer ends thereof. The rollers turn freely and operate in conjunction with the guide tracks and therefore the inclined planes of the guide tracks provide the desired camming action to operate the crank arm. The other end of the crank arm is fixedly secured to the intermediate portion of the rocker shaft 26 at 52 (Fig. 4) and this end portion is laterally directed, that is, lateral to the main crank arm with the lateral portion formed into an abutment or stop shoulder 54. This stop shoulder prevents the crank arm from going too far to the right. In other words, it limits its arc of swing to the approximate folded ready-to-use position seen in Fig. 4 in full lines and also its extreme position at the right shown in dotted lines in the same figure.

It will be evident that the roller-equipped crank arm on the rocker shaft cooperates properly with the tracks of the ramp-like device so that when the rollers are in the full line position seen and engaged with the keeper hooks nothing happens so far as the invention is concerned. When, however, the truck body starts to swing up, the crank arm 46 comes gradually into play and the rollers are released from the keeper hooks and gradually ride up the ramp, so to speak, imparting limited rotation to the rocker shaft 26 and, in turn, operating the push-pull rods 22 which open the latches 20 to release the tail gate 16.

As already mentioned, the invention aims and satisfactorily functions to unlatch and latch the tail gate of the dump truck body without any effort on the part of the operator, using the motion and power and weight of the dump body in achieving the results attained. The roller-equipped arm therefore becomes a trip arm and when it is in its extreme "open" position it actually strikes against the bottom 56 of the dump body as shown (Fig. 4) in phantom lines. This puts the arm in a satisfactory position so that when the truck body is allowed to come back down to its horizontal transporting position the rollers are then readied and are in position to drop down on the tracks, and ride down the tracks causing the arm 46 to fold and imparting the desired crank motion to the shaft.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a dumping truck having a mobile horizontal chassis, a dump body positioned for use atop said chassis, means hingedly connecting a rear end portion of said dump body with a cooperable rear end portion of said chassis and thus serving to mount said dump body on the chassis so that it may swing up and down in a vertical plane relative to the horizontal plane of the chassis, said dump body being open at its rear discharge end, an openable and closable tail gate which is normally closed, that is, when the dump body is in its load carrying horizontal position atop the chassis, said tail gate having an upper portion pivotally connected with cooperating portions of the openable and closable discharge end of the dump body and being adapted to swing outwardly to an open position when the dump body is in a rearwardly and downwardly inclined dumping position, said tail gate thus having a freely swingable lower end which lower end portion is provided with a fixed retainer, push-pull rods slidingly mounted on lower portions of the opposite sides of said dump body and provided at their rear ends with integral latches releasably engaging the retainer on said tail gate in a manner to serve to keep said gate closed, said rod being spring biased to slide rearwardly and functioning to automatically disengage the latches from the retainer when the dump body is elevated and the tail gate has been swung to a load-releasing dump body emptying position, a shaft arranged beneath and extending transversely across a forward portion of the dump body and mounted for rotation in bearings provided therefor on said body, means operatively connecting said shaft with adjacent forward end portions of said push-pull rods in a manner to impart forward and rearward sliding movement to said rods, a forwardly extending crank arm rigidly connected at its rear end to a central portion of said shaft, said crank arm being at right angles to the shaft, a lifting and lowering jack interposed for extensible and contractible operation between the dump body and the chassis and having its respective end portions connected hingedly with the body and chassis respectively and serving, when it is extended to lift the dump body to an inclined load discharging position, a ramp-like device fixedly mounted atop said chassis and interposed between the forward end of the chassis and the liftable and lowerable forward end portion of the dump body, said shaft having a position above the ramp-like device for cooperative relation thereto and said crank arm being disposed in an operating position between the shaft and the top portion of the normally underlying ramp-like device, said ramp-like device embodying forwardly and downwardly inclined tracks, the forward end portion of said crank arm being provided with a pair of freely rotatable rollers having rolling operable engagement with their respective tracks, an means carried by the ramp-like device and cooperable with said crank arm and rollers to keep the rollers in a prescribed normal position, a position assumed by the rollers until the forward end of the dump body has been jacked up to a predetermined elevated position.

2. The structure defined in claim 1 and wherein the aforementioned means comprises a pair of keeper hooks, said hooks being aligned with their respective tracks and fixedly mounted on said tracks at the forward ends of the tracks and being turned in toward each other, and said rollers being releasably engaged with said hooks when the dump body is in its horizontal loaded position, whereby when the dump body has been jacked up to a rearwardly and downwardly inclined load discharging position the rollers will have been disengaged and released from the hooks and said crank freed from and elevated to a position above said ramp-like device.

3. Tail gate retaining and releasing means adapted for use on and in association with a mobile chassis and a tail gate-equipped dump body having means whereby it is tiltably mounted for dumping on the rear end of the chassis, said means comprising a shaft adapted to be mounted for rotation in bearings provided therefor, at least one elongated push-pull rod having a forward end connected to and for operation by a cooperating end of said shaft, the rear end of said rod being provided with a rigid fixedly secure latch, a crank arm fixedly secured at one end to a central portion of said shaft, a pair of freely rotatable rollers mounted rotatably on the other end of said crank arm, said one end of said crank arm being provided with a stop shoulder which is adapted to limit the swinging movement of the crank arm in one predetermined direction, a ramp-like device adapted to be fixedly mounted on a portion of the aforementioned chassis in a position beneath the central portion of the shaft and the crank arm carried by said central portion, said device embodying a pair of spaced parallel inclined tracks, said tracks being spaced apart and said crank arm being aligned with and cooperatively operable with the space between the tracks, the rollers on said crank arm being aligned with and operatively engageable with their respective tracks, and fixed upstanding keeper hooks secured to the forward end portions of the respective tracks, said rollers being releasably engageable with said hooks.

References Cited in the file of this patent

UNITED STATES PATENTS

| | | |
|---|---|---|
| 2,009,466 | Yeager | July 30, 1935 |
| 2,174,956 | Allison | Oct. 3, 1939 |
| 2,261,745 | Sand | Nov. 4, 1941 |
| 2,552,442 | McClish | May 8, 1951 |
| 2,635,919 | Watson | Apr. 21, 1953 |
| 2,768,858 | Lauver | Oct. 30, 1956 |

FOREIGN PATENTS

| | | |
|---|---|---|
| 476,394 | Canada | Aug. 28, 1951 |
| 190,739 | Germany | Oct. 1, 1907 |
| 649,202 | Great Britain | Jan. 24, 1951 |